US 6,493,481 B2

(12) United States Patent
Okayama et al.

(10) Patent No.: US 6,493,481 B2
(45) Date of Patent: Dec. 10, 2002

(54) OPTICAL SWITCH UNIT (75) Inventors: Hideaki Okayama, Tokyo (JP); Takayuki Kakinuma, Tokyo (JP); Haruo Mori, Tokyo (JP)

(73) Assignee: Oki Electric Industry Co., Ltd. (JP)

( * ) Notice: Subject to any disclaimer, the term of this patent is extended or adjusted under 35 U.S.C. 154(b) by 28 days.

(21) Appl. No.: 09/778,858

(22) Filed: Feb. 8, 2001

(65) Prior Publication Data
US 2001/0024541 A1 Sep. 27, 2001

(30) Foreign Application Priority Data
Feb. 9, 2000 (JP) .................... 2000-031951

(51) Int. Cl.[7] .............. G02B 6/26; G02B 6/42
(52) U.S. Cl. .................... 385/17; 385/24
(58) Field of Search .................... 385/17, 24

(56) References Cited
U.S. PATENT DOCUMENTS 5,048,910 A * 9/1991 Caron ............... 385/17
6,005,698 A * 12/1999 Huber et al. .......... 385/17
6,044,185 A * 3/2000 MacDonald .......... 385/17
6,259,834 B1 * 7/2001 Shani ................ 385/17
6,317,529 B1 * 11/2001 Kashima ............. 385/17

FOREIGN PATENT DOCUMENTS

JP         10-10588    *   1/1998    ......... G02F/1/313

* cited by examiner

Primary Examiner—Tulsidas Patel
Assistant Examiner—Hae Moon Hyeon
(74) Attorney, Agent, or Firm—Venable; Robert Frank; Jeffri A. Kaminski (57) ABSTRACT K×K optical switch unit according to the present invention is comprised of input ports 1-1, . . . 1-36, 1×M optical matrix switches 5-1-1, . . . 5-4-9 connected with the input ports 1-1, . . . 1-36, N×N optical matrix switches 7-1-1, . . . 7-4-2, and 10-1-1, . . . 10-4-2 connected with the 1×M optical matrix switches 5-1-1, . . . 5-4-9, an M×1 optical matrix switches 13-1-1, . . . 13-4-9 connected with the N×N optical matrix switches 7-1-1, . . . 7-4-2, and 10-1-1, . . . 10-4-2, and output ports 2-1, . . . 2-36 connected with the M×1 optical matrix switches 13-1-1, . . . 13-4-9, where K=M×N, M and N are integers more than 1.

12 Claims, 4 Drawing Sheets

N x N optical matrix switch (:N=8)

OPTICAL SWITCH UNIT

FIELD OF THE INVENTION

The invention relates to an optical switch unit having input-ports and output-ports for optical signals. Then, the optical switch unit can selectively switch inner switch elements for connecting an optical input port to an optical port.

BACKGROUND OF THE INVENTION

In recent years, large scale optical switch units having comparatively many input ports have been proposed. For example, a 32×32 optical switch unit has 32 input ports and 32 output ports. And, an optical signal inputted in any one of the input ports can be selectively output from any one of the output ports.

These large scale optical switch units are comprised of some smaller scale waveguide-type optical matrix switches, e.g., waveguide-type 8×8 optical matrix switches. In order to increase the number of output ports, these smaller waveguide-type optical matrix switches form multistage-connections.

Regarding these multistage waveguide-type optical matrix switches, a three-stage construction applying to a cross-network is used generally, e.g., "Optical Switch Architectures for Optical Path Cross-Connect"; Tetuya Nishi, Satoshi Kuroyanagi and Tomohiro Ishihara; Proceedings of the 1998 IEICE General Conference, B-10-97(March 1998) discloses these constructions.

Though, these present optical switch units constructed by multistage-connecting of the waveguide-type optical matrix switches have a problem that the present optical switch units have comparative large insertion losses because they need three-stage-connecting of the waveguide-type optical matrix switches and each of them has large insertion loss.

Therefore, the present optical switch units additionally need optical amplifiers for compensating the insertion loss.

For example, each of silica-based 8×8 matrix switches has about 5 dB insertion loss, then three-stage-connecting of the 8×8 matrix switches has more than 15 dB insertion loss totally.

Also in Clos-networks, the present optical switch units need three-stage constructions, and three-stage boards were needed for containing the optical matrix switches. For inter-board connection of the three-stage boards, connections occur at two sections and each of the two sections needs about $r^2$ lines for inter-board connection, where r is a port number of an optical matrix switch.

Consequently, because a large number lines are centralized in limited area of the optical switch unit, a production process of the optical switch unit is more complicated.

Furthermore, in connection with the complicated production process, when expanding the optical switch unit's scale, each of the three-stages of the optical switch unit needs additional boards.

SUMMARY OF THE INVENTION

It is an object of the invention to provide an large scale optical switch unit having a simple construction and low insertion loss.

To resolve the above problems, a K×K optical switch unit according to the present invention is comprised of an input port, a 1×M optical matrix switch connected with the input port, an N×N optical matrix switch connected with the 1×M optical matrix switch, an M×1 optical matrix switch connected with the N×N optical matrix switch, and an output port connected with the M×1 optical matrix switch, where K=M×N, M and N are integers more than 1.

DETAILED DESCRIPTION OF THE PREFERRED EMBODIMENTS

In following descriptions, "K×L the optical switch unit" means an optical switch unit having K input terminals and L output terminals, and an optical signal inputted in any one of the input terminals can be outputted from any one of the output terminals.

Moreover, in following descriptions, "optical matrix switch" means a construction-unit of the optical switch unit which is a waveguide-type optical matrix switch formed on single substratum and comprised of optical switch elements for switching.

General descriptions of the invention's optical switch unit are as follows. Namely, the invention's K×K optical switch unit has K optical signal input ports, where K=M×N, M and N are integers more than 1.

Each of the K optical signal input ports is connected with each of K units of 1×M optical matrix switches. Therefore, 1st stage optical matrix switch group which is comprised of the K units of 1×M optical matrix switches set in parallel and has (K×M) output terminals. The (K×M) output terminals of the 1st stage optical matrix switch group are connected with 2nd stage optical matrix switch group which is comprised of $M^2$ units of N×N optical matrix switches set in parallel and has (K×M) output terminals. The (K×M) output terminals of the 2nd stage optical matrix switch group are connected with 3rd stage optical matrix switch group which is comprised of K units of M×1 optical matrix switches set in parallel and has K output terminals. Each of the K output terminals of the 3rd stage optical matrix switch group is connected with each of K optical signal output ports. Then, a control circuit controls optical switch elements of the 1st stage, 2nd stage and 3rd stage optical matrix switch groups.

Next, details of an optical switch unit applied the above structure will be described as a first embodiment, where K=36, M=4, and N=9.

In the first embodiment, a silica-based waveguide-type 1×4 optical matrix switch is used as the 1×M or M×1 optical matrix switch, a silica-based waveguide-type 9×9 optical matrix switch is used as the N×N optical matrix switch, and they are used for realizing a 36×36 optical switch unit.

Figure 1:
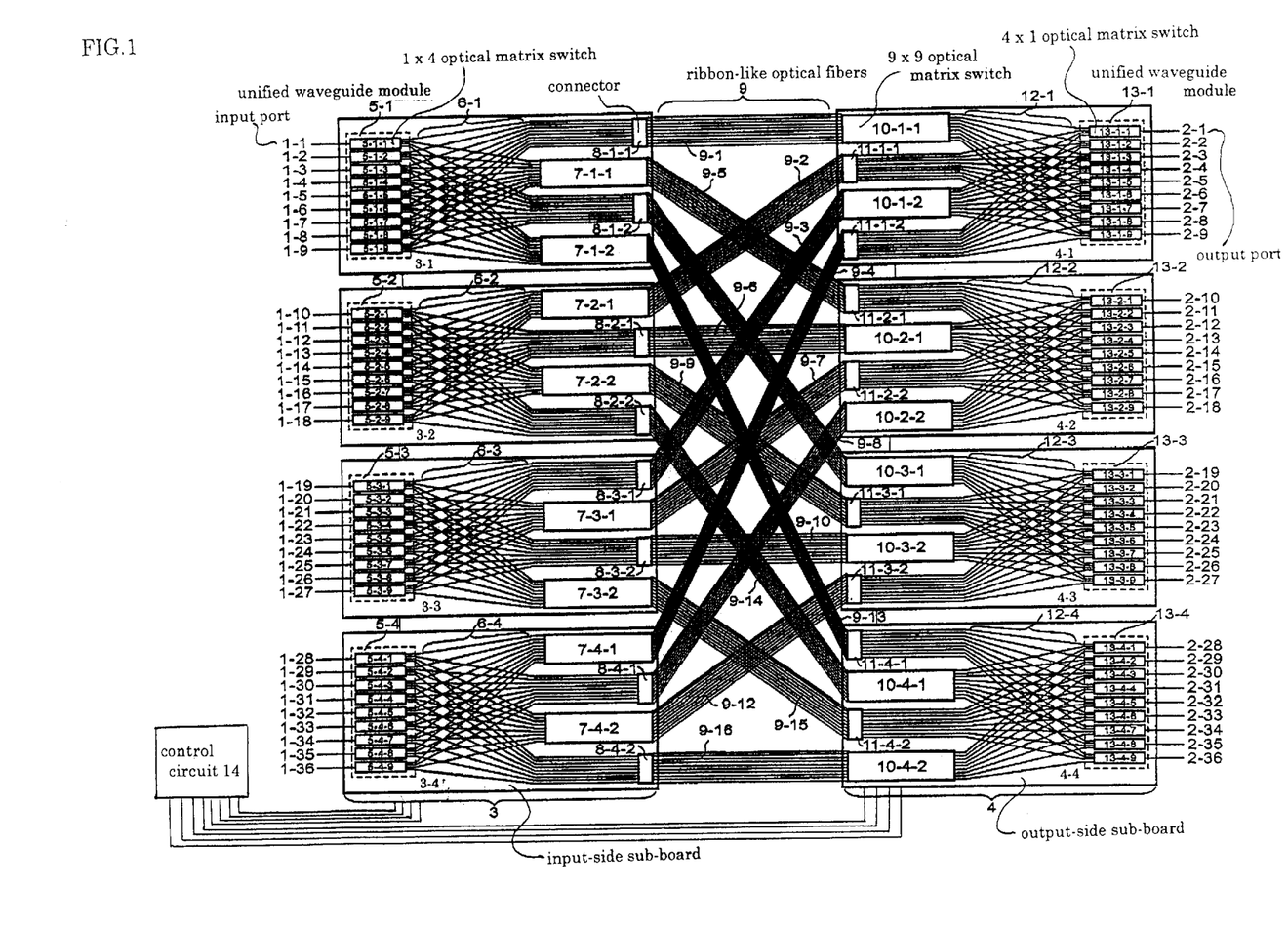
FIG. 1 is a schematic diagram of a 36×36 optical switch unit of first embodiment.

As shown in FIG. 1, the embodiment's 36×36 optical switch unit has 1st, . . . , 36th input ports 1-1, . . . , 1-36 and 1st, . . . , 36th output ports 2-1, . . . , 2-36, where the 1st, . . . , 36th are correlated with "K=36".

Broadly, the 36×36 optical switch unit is comprised of an input-side board 3 connected with the input port 1-1, . . . , 1-36, and an output-side board 4 connected with the output ports 2-1, ..., 2-36. And, the input-side board 3 and the output-side board 4 are connected by a plurality of nine-core ribbon-like optical fibers 9-1, ..., 9-16, where the "nine-core" is correlated with "N=9".

Furthermore, multi-core fiber connectors, which are not shown in FIG. 1 are prepared in the middle of the ribbon-like optical fibers 9 for easy connecting.

The input-side board 3 has 1st, ..., 4th input-side sub-board 3-1, ..., 3-4, where the 1st, ..., 4th are correlated with "M=4".

The 1st input-side sub-board 3-1 has 1st, ..., 9th 1×4 optical matrix switches 5-1-1, ..., 5-1-9 connected with each of the 1st, ..., 9th input port 1-1, ..., 1-9, 1st and 2nd 9×9 optical matrix switches 7-1-1 and 7-1-2, and 1st and 2nd connectors 8-1-1 and 8-1-2, where the 1st, ..., 9th are correlated with "N=9".

The 1st, ..., 9th 1×4 optical matrix switches 5-1-1, ..., 5-1-9, and 1st 9×9 optical matrix switch 7-1-1, 2nd 9×9 optical matrix switch 7-1-2, 1st connector 8-1-1 or 2nd connector 8-1-2 are connected by inside wiring 6-1.

Similarly, the 2nd input-side sub-board 3-2 has 10th, ..., 18th 1×4 optical matrix switches 5-2-1, ..., 5-2-9 connected with each of the 10th, ..., 18th input port 1-10, ..., 1-18, 3rd and 4th 9×9 optical matrix switches 7-2-1 and 7-2-2, 3rd and 4th connectors 8-2-1 and 8-2-2, and inside wiring 6-2 for connecting them.

The 3rd input-side sub-board 3-3 has 19th, ..., 27th 1×4 optical matrix switches 5-3-1, ... 5-3-9 connected with each of the 19th, ..., 27th input port 1-19, ..., 1-27, 5th and 6th 9×9 optical matrix switches 7-3-1 and 7-3-2, 5th and 6th connectors 8-3-1 and 8-3-2, and inside wiring 6-3 for connecting them.

The 4th input-side sub-board 3-4 has 28th, ..., 36th 1×4 optical matrix switches 5-4-1, ..., 5-4-9 connected with each of the 28th, ..., 36th input port 1-28, ..., 1-36, 7th and 8th 9×9 optical matrix switches 7-4-1 and 7-4-2, 7th and 8th connectors 8-4-1 and 8-4-2, and inside wiring 6-4 for connecting them.

Also, the output-side board 4 has 1st, ..., 4th output-side sub-board 4-1, ..., 4-4, where the 1st, ..., 4th are correlated with "M=4".

The 1st output-side sub-board 4-1 has 9th 9×9 optical matrix switch 10-1-1 connected with the 1st connector 8-1-1 by the ribbon-like optical fibers 9, 9th connector 11-1-1 connected with the 3rd 9×9 optical matrix switch 7-2-1 by the ribbon-like optical fibers 9, 10th 9×9 optical matrix switch 10-1-2 connected with the 5th connector 8-3-1 by the ribbon-like optical fibers 9, 10th connector 11-1-2 connected with the 7th 9×9 optical matrix switch 7-4-1 by the ribbon-like optical fibers 9, and 1st, ..., 9th 4×1 optical matrix switches 13-1-1, ..., 13-1-9 connected with each of the 1st, ..., 9th output ports 2-1, ..., 2-9.

Then, the 9th 9×9 optical matrix switch 10-1-1, the 10th 9×9 optical matrix switch 10-1-2, the 9th connector 11-1-1 or 10th connector 11-1-2, and the 1st, ..., 9th 4×1 optical matrix switches 13-1-1, ..., 13-1-9 are connected by inside wiring 12-1.

Similarly, the $2^{nd}$ output-side sub-board 4-2 has $11^{th}$ connector 11-2-1 connected with the $1^{st}$ 9×9 optical matrix switch 7-1-1, $11^{th}$ 9×9 optical matrix switch 10-2-1 connected with the $3^{rd}$ connector 8-2-1, $12^{th}$ connector 11-2-2 connector with the $5^{th}$ 9×9 optical matrix switch 7-3-1, $12^{th}$ 9×9 optical matrix switch 10-2-2 connected with the $7^{th}$ connectors 8-4-1, the $10^{th}$, ..., $18^{th}$ optical matrix switches 13-2-1, ..., 13-2-1 connected with each of the $10^{th}$, ..., $18^{th}$ output ports 2-10, ..., 2-18, and inside wiring 12-2 for connecting them.

The 3rd output-side sub-board 4-3 has 13th 9×9 optical matrix switch 10-3-1 connected with the 2nd connector 8-1-2, 13th connector 11-3-1 connected with the 4th 9×9 optical matrix switch 7-2-2, 14th 9×9 optical matrix switch 10-3-2 connected with the 6th connector 8-3-2, 14th connector 11-3-2 connected with the 8th 9×9 optical matrix switch 7-4-2, 19th, ..., 27th 4×1 optical matrix switches 13-3-1, ..., 13-3-9 connected with each of the 19th, ..., 27th output ports 2-19, ..., 2-27, and inside wiring 12-3 for connecting them.

The 4th output-side sub-board 4-4 has 15th connector 11-4-1 connected with the 2nd 9×9 optical matrix switch 7-1-2, 15th 9×9 optical matrix switch 10-4-1 connected with the 4th connector 8-2-2, 16th connector 11-4-2 connected with the 6th 9×9 optical matrix switch 7-3-2, 16th 9×9 optical matrix switch 10-4-2 connected with the 8th connector 8-4-2, 28th, ..., 36th 4×1 optical matrix switches 13-4-1, ..., 13-4-9 connected with each of the 28th, ..., 36th output ports 2-28, ..., 2-36, and inside wiring 12-4 for connecting them.

Then, a control circuit 14 controls switching of optical switch elements included in the $1^{st}$, ..., $36^{th}$ 1×4 optical matrix switches 5-1-1, ..., 5-4-9, the $1^{st}$, ..., $16^{th}$ 9×9 optical matrix switches 7-1-1, ..., 10-4-2 and the $1^{st}$, ..., $36^{th}$ 4×1 optical matrix switches 13-1-1, ..., 13-4-9. Therefore, an optical signal inputted to any input port can be outputted form any output port.

On the 36×36 optical switch unit, it is clear by the above explanation that the $1^{st}$, ..., $36^{th}$ 1×4 optical matrix switches 5-1-1, ..., 5-4-9 form the $1^{st}$ stage optical matrix switch group, the $1^{st}$, ..., $16^{th}$ 9×9 optical matrix switches 7-1-1, ..., 10-4-2 form the $2^{nd}$ stage optical matrix switch group, and the $1^{st}$, ..., $36^{th}$ 4×1 optical matrix switches 13-1-1, ..., 13-4-9 form the $3^{rd}$ stage optical matrix switch group.

Moreover, the above description about connecting relations between the input-side board 3 and the output-side board 4 may be hard to clearly understand. The following description is generalized rule of the connecting relations.

The input-side board is comprised of the 1st, ..., Mth input-side sub-boards, and the output-side board is comprised of the 1st, ..., Mth output-side sub-boards similarly.

Each of the input-side sub-board is comprised of N units of 1×M optical matrix switches, and 1st, ..., Mth input-side blocks which are connected with the N units of 1×M optical matrix switches, wherein each of the input-side blocks is chosen from an N×N optical matrix switch and a connector.

For example, in the case of FIG. 1, the connector 8-1-1 corresponds to the 1st input-side block of the 1st input-side sub-board 3-1, and the 9×9 optical matrix switch 7-1-1 corresponds to the 2nd input-side block of the 1st input-side sub-board 3-1. Similarly, the 9×9 optical matrix switch 7-4-2 corresponds to the 3rd input-side block of the 4th input-side sub-board 3-4, and the connector 8-4-2 corresponds to the 4th input-side block of the 4th input-side sub-board 3-4.

Also, each of the output-side sub-board is comprised of 1st, ..., Mth output-side block, and N units of M×1 optical matrix switches connected with the 1st, ..., Mth output-side block, wherein each of the output-side blocks is chosen from an N×N optical matrix switch and a connector.

For example, in the case of FIG. 1, the 9×9 optical matrix switch 10-1-1 corresponds to the 1st output-side block of the 1st output-side sub-board 4-1, and the connector 11-1-1 corresponds to the 2nd output-side block of the 1st output-side block. Similarly, the connector 11-4-2 corresponds to the 3rd output-side block of the 4th output-side sub-board 4-4, and the 9×9 optical matrix switch 10-4-2 corresponds to the 4th output-side block of the 4th output-side sub-board 4-4.

Based on these constructions, "n"th input-side block of "m"th input-side sub-board (where 1≦m≦M, and 1≦n≦N) and "m"th output-side block of"n"th output-side sub-board are connected by a ribbon-like optical fibers having N optical fiber cores and formed like a tape.

Then, if the "n"th input-side block of the "m"th input-side sub-board is the N×N optical matrix switch, the "m"th output-side block of the "n"th output-side sub-board is the connector. Conversely, if the "n"th input-side block of the "m"th input-side sub-board is the connector, the "m"th output-side block of the "n"th output-side sub-board is the N×N optical matrix switch.

For example, in the case of FIG. 1, a connector 8-1-1 corresponding to the 1st input-side block of the 1st input-side sub-board 3-1 is connected with a 9×9 optical matrix switch 10-1-1 corresponding to the 1st output-side block of the 1st output-side sub-board 4-1, and a 9×9 optical matrix switch 7-1-1 corresponding to the 2nd input-side block of the 1st input-side sub-board 3-1 is connected with a connector 11-2-1 corresponding to the 1st output-side block of the 2nd output-side sub-board 4-2.

Similarly, a 9×9 optical matrix switch 7-4-2 corresponding to the $3^{rd}$ input-side block of the $4^{th}$ input-side sub-board 3-4 is connected with a connector 11-3-2 corresponding to the $4^{th}$ output-side block of the $3^{rd}$ output-side sub-board 4-3, and a connector 8-4-2 corresponding to the $4^{th}$ input-side block of the $4^{th}$ input-side sub-board 3-4 is connected with a 9×9 optical matrix switch 10-4-2 corresponding to the $4^{th}$ output-side block of the $4^{th}$ output-side sub-board 4-4.

The above description clearly explains that the 9×9 optical matrix switches and the connectors have one-to-one correspondence.

Also, in the embodiment shown in FIG. 1, the alternative of a 9×9 optical matrix switch or a connector at the "n"th input-side block of the "m"th input-side sub-board is determined as follows. If n+M×(m−1) is an even number, the "n"th input-side block of the "m"th input-side sub-board is chosen as a 9×9 optical matrix switch.

Conversely, if n+M×(m−1) is an odd number, the "n"th input-side block of the "m"th input-side sub-board is chosen as a connector.

Then, an outline of operation of the optical switch unit, e.g., an operation for connecting the input port 1-9 with the output port 2-27 is explained as follows.

First, the control circuit 14 identifies which of the output-side sub-boards 4-1, . . . , 4-4 is connected with the output port 2-27. In this embodiment, the output port 2-27 is connected with the output-side sub-board 4-3, then, optical switch elements in the 1×4 optical matrix switch 5-2-1 connecting the input port 1-10 are switched for composing a path into the 9×9 optical switch matrix 7-2-2.

Next, optical switch elements in the 9×9 optical switch matrix 7-2-2 are switched for composing a path through the connectors 11-3-1 into the 4×1 the optical switch matrix 13-3-9. One of the outputs of the 4×1 the optical switch matrix 13-3-9 is connected with the output port 2-27.

Consequently, an optical signal into the input port 1-10 can be outputted from the output port 2-27.

In this case, the connector is connected after the 9×9 the optical switch matrix. But, connecting order is not limited to the case, e.g., in case of connecting between the input port 1-9 and the output port 2-9, the connector is connected before the 9×9 the optical switch matrix or the connecting order is reversed However, even if the connecting order is reversed, they have the same connecting elements or 9×9 optical matrix switch and connector. Then, irrespective of connecting paths between the input ports and the output ports, the insertion loss of the optical switch unit is fixed.

The invention's optical switch unit is not limited to the above 36×36 optical switch unit, and can realize any K×K optical switch units by combining any M and N, where M and N are integers more than 1.

Figure 2:
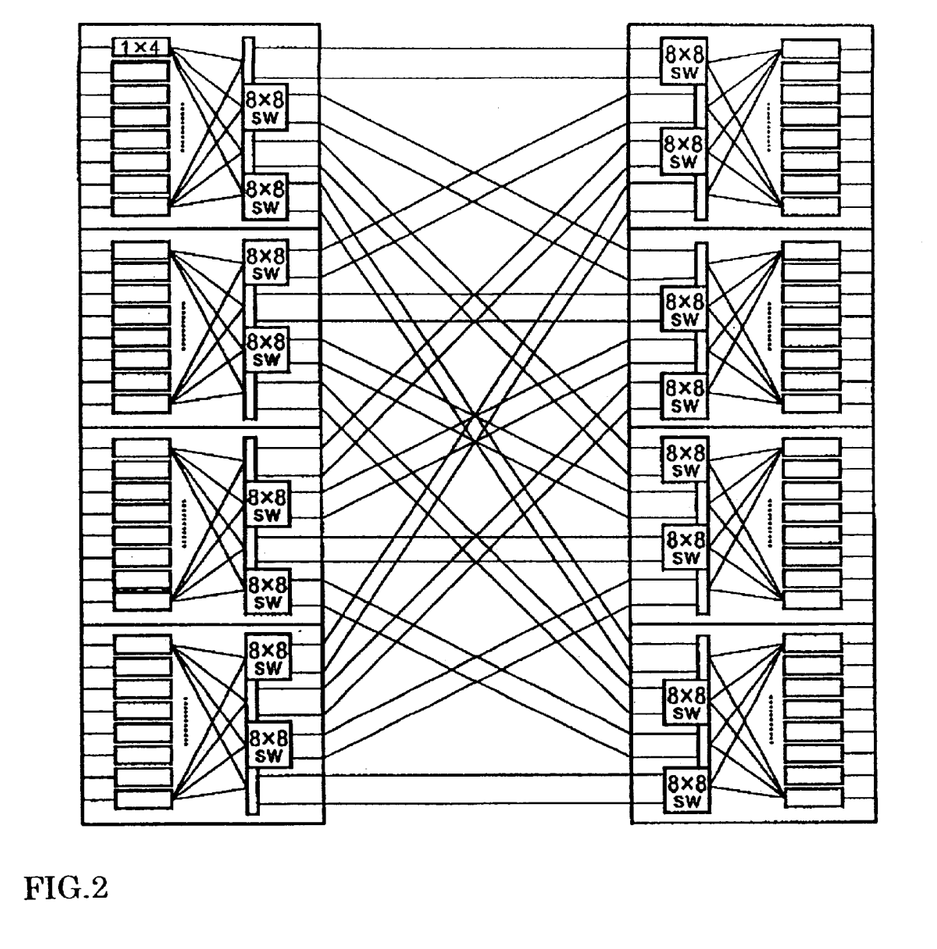
FIG. 2 is a schematic diagram of a 32×32 optical switch unit applied the invention.

For example, by choosing of K=32, M=4 and N=8, a 32×32 optical switch unit disclosed in FIG. 2 can be realized.

Based on N=8, the 32×32 optical switch unit has some differences between the 36×36 optical switch unit disclosed in FIG. 1.

Namely, each of the 1×4 optical matrix switches of the 1st, . . . , 4th input-side sub-board and the 4×1 optical matrix switches of the 1st, . . . , 4th output-side sub-board is 8 units, the optical switch unit uses 8×8 optical matrix switches, and ribbon-like optical fibers are eight-core ribbon-like optical fibers. And, the other connecting relations are the same.

Figure 3:
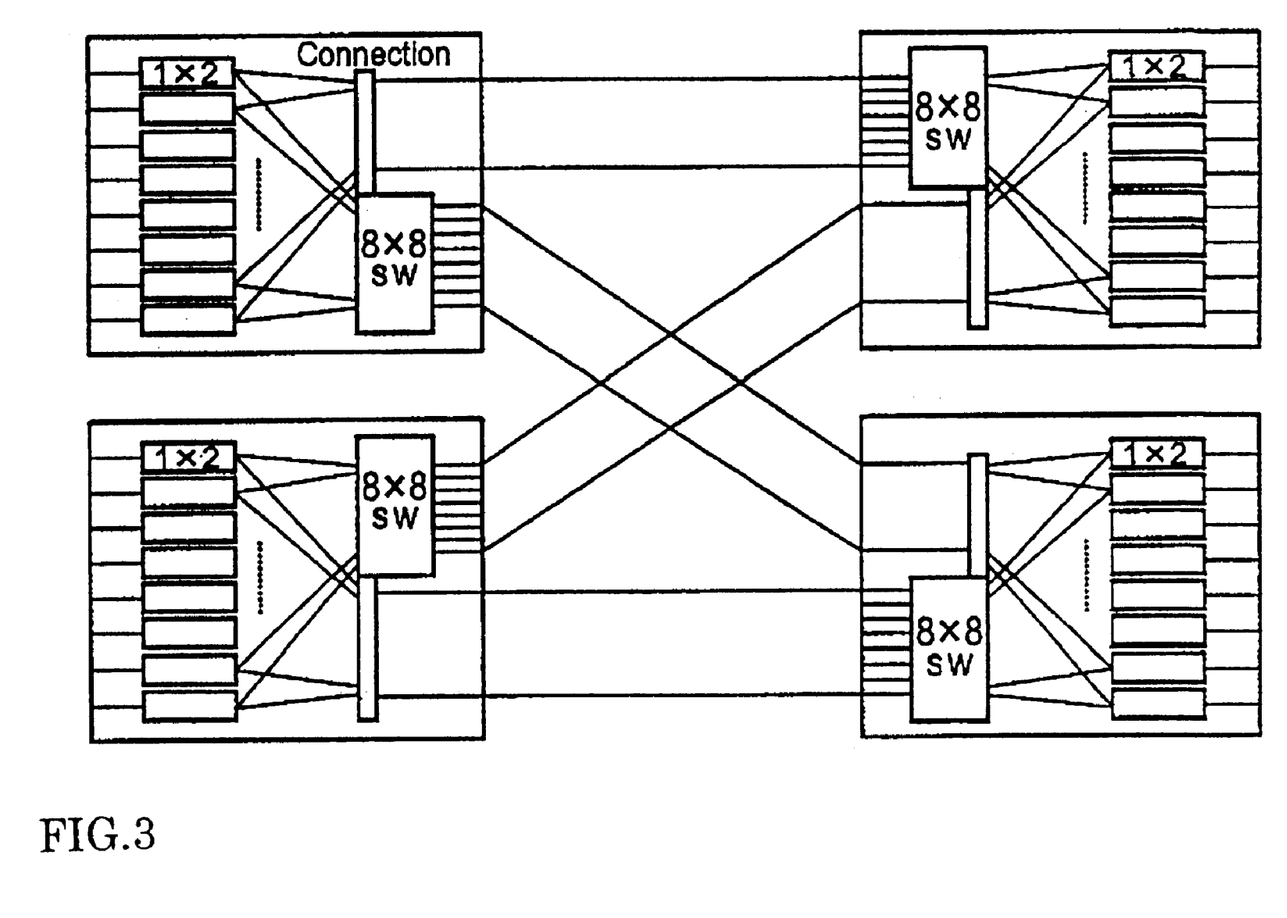
FIG. 3 is a schematic diagram of a 16×16 optical switch unit applied the invention.

Similarly, by choosing of K=16, M=2 and N=8, a 16×16 optical switch unit disclosed in FIG. 3 can be realized.

Moreover, the embodiment disclosed in FIG. 1 determines that if n+M×(m−1) is an even number, the "n"th input-side block of the "m"th input-side sub-board is chosen as a 9×9 optical matrix switch. But the invention is not limited to the determination, and can be applied to that if n+M×(m−1) is an odd number, the "n"th input-side block of the "m"th input-side sub-board is chosen as a 9×9 optical matrix switch.

The optical matrix switches used in the embodiment are generally constructed as a module form connected with optical fibers.

When these modularized optical matrix switches are used as each of the 1×M optical matrix switches or the M×1 optical matrix switches, then, e.g., the 1st, . . . , 9th 1×4 optical matrix switches 5-1-1, . . . , 5-1-9 of FIG. 1 occupy relatively large areas, and need many construction parts.

As shown in FIG. 1 as blocks formed by a dotted line, the 1×4 optical matrix switches contained in each of the input-side sub-boards or the output-side sub-boards, e.g., the $1^{st}$, . . . , $9^{th}$ 1×4 optical matrix switches 5-1-1, . . . , 5-1-9 can be integrated as unified waveguide modules 5-1, . . . , 5-4 and 13-1, . . . , 13-4.

Also, in FIG. 1, the 9×9 optical matrix switches and the connectors contained in the input-side sub-board are alternately arranged in parallel, e.g., the 9×9 optical matrix switches 7-1-1, 7-2-2 and the connectors 8-1-1, 8-1-2 contained in the input-side sub-board 3-1. However, arrangement of the N×N optical matrix switches and the connectors is not limited to the embodiment. And, if any structure satisfies the rule of the connecting relations mentioned above, the structure can have functions as the invention's optical switch unit.

Also, in FIG. 1, it is clear from these constructions, the input-side sub-board 3-1 and the input-side sub-board 3-2 are substantially same constructions and the input-side sub-board 3-2 is used in the top and bottom is reversed.

In this point, the output-side sub-boards has the same relation too, Furthermore, the input-side sub-board 3-1, . . . , 3-4 and the output-side sub-board 4-1, ..., 4-4 are substantially same constructions and they are used by selecting proper diction. Then, the embodiment's construction can unify the construction of sub-board.

Furthermore, in the invention, the 1×M and M×1 optical matrix switches, and the N×N optical matrix switches can be selected from any constructions.

For example, the 1×4 optical matrix switch discloses in FIG. 1 can be constructed by connecting general 1×2 type and 2×1 type optical switch element in series.

Many types of optical matrix switch architecture can be used for N×N optical matrix switch. Some examples are cross bar architecture, rearranged cross bar with uniform optical switching element number in all paths, tree-structure comprising 1×n and n×1 switches, various types of wide-sense nonblocking networks, rearrangeable networks for high-speed packet exchange and blocking networks such as a banyan network.

Figure 4:
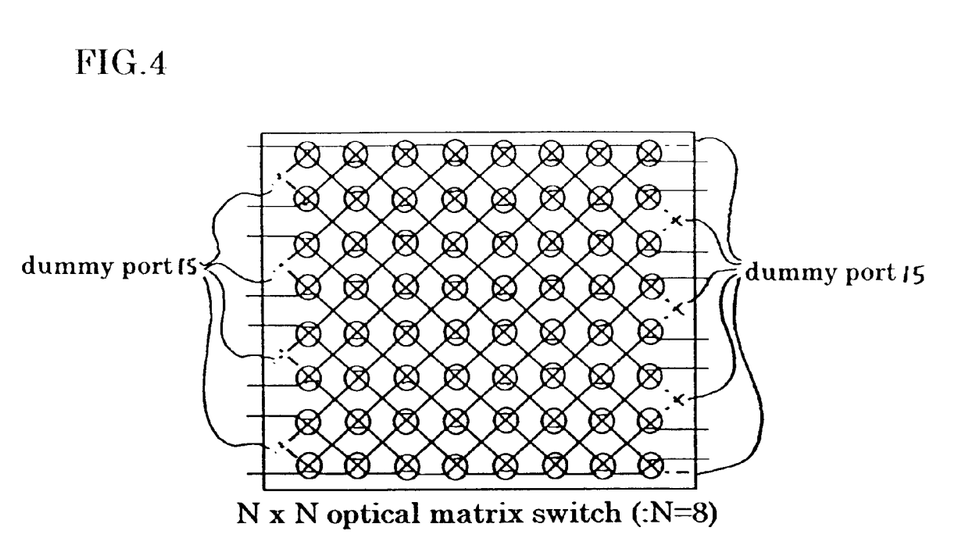
FIG. 4 is a schematic diagram of a N×N optical matrix switch having dummy-ports.

Furthermore, at the invention, the N×N optical matrix switches can be added dummy-ports 15 shown in FIG. 4 and explained in "Japan patent application: publication No.10-10588" or "Silica-Based 8×8 Optical Matrix Switch Integrating New Switching Units With Large Fabrication Tolerance"; JOURNAL OF LIGHTWAVE TECHNOLOGY, VOL.17, NO.5, MAY 1999, pp771–781 as "idle ports."

When the dummy-ports apply to the N×N optical matrix switches, not only a cross-talk occurring in the N×N optical matrix switches, but also a cross-talk occurring in the 1×M optical matrix switches can be removed by the dummy-ports of the N×N optical matrix switches.

As explained above, the invention realizes a K×K optical switch unit by combining of the 1×M optical matrix switches, the N×N optical matrix switches and the M×1 optical matrix switches.

As explained above, the invention realizes a K×K optical switch unit by combining 1×M optical matrix switches, N×N optical matrix switches ands M×1 optical matrix switches.

Generally speaking, a 1×M type optical matrix switch's construction is simpler than a N×N type optical matrix switch's then, compared with conventional ones using three-stage connection of N×N type optical matrix switches, the invention can reduce the insertion loss.

For example, a 1×4 optical matrix switch has about 3 dB insertion loss and a 8×8 optical matrix switch has about 5 dB insertion loss, then this invention can realize a 32×32 optical switch unit having about 11 dB insertion loss, which is comprised of 1×4, 8×8, and 4×1 optical matrix switches. While, conventional 32×32 optical switch unit constructed three-stage connection of 8×8 optical matrix switches has about 15 dB insertion loss.

Moreover, by using the N×N optical matrix switches and the ribbon-like optical fibers, a number of lines for inter-board connection is $(K/N)^2$ or $1/N^2$ of conventional number.

Also, the invention's optical switch unit can be comprised of two boards or the input-side board and the output-side board, then when expand the optical switch unit's scale, a set-up process is simpler than the conventional ones.

What is claimed is:

1. A K×K optical switch unit comprising:
a first ($1^{st}$) stage optical matrix switch group which is comprised of a plurality of 1×M optical matrix switches connected in parallel;
a second ($2^{nd}$) stage optical matrix switch group which is comprised of a plurality of N×N optical matrix switches connected in parallel and connected with said $1^{st}$ stage optical matrix switch group;
a third ($3^{rd}$) stage optical matrix switch group which is comprised of a plurality of M×1 optical matrix switches connected in parallel and connected with said $2^{nd}$ stage optical matrix swtich group, where K=M×N, M and N are integers more than 1;
an input-side board containing said 1st stage optical matrix switch group and a part of said $2^{nd}$ stage optical matrix switch group; and
an output-side board containing the other part of said $2^{nd}$ stage optical matrix switch group and said $3^{rd}$ stage optical matrix switch group.

2. The K×K optical switch unit according to claim 1, wherein said input-side board is comprised of a plurality of input-side sub-boards, each of said input-side board further comprising:
N units 1×M optical matrix switches; and
$1^{st}$–Mth input-side blocks connected with said N units of 1×M optical matrix switches, wherein each of said input-side blocks is chosen from an N×N optical matrix switch and a connector;
wherein said output-side board is comprised of a plurality of output-side sub-boards, each of said output-side sub-boards further comprising:
$1^{st}$–Mth output-side blocks, wherein each of said output-side blocks is one of an N×N optical matrix switch and a connector; and
N units M×1 optical matrix switches connected with said $1^{st}$–Mth output-side blocks;
wherein one said input-side block and one said output-side block are connected by ribbon-like optical fibers; wherein if said input-side block is said N×N optical matrix switch then said one connected output-side block is said connector, and if said input-side block is said connector, then said one connected output-side block is said N×N optical matrix switch.

3. The K×K optical switch unit according to claim 2, wherein said N units of 1×M optical matrix switches of said input-side sub-board or said N units of M×1 optical matrix switches of said output-side sub-board is an unified waveguide module.

4. The K×K optical switch unit according to claim 1, wherein said $1^{st}$ stage optical matrix switch group and said $2^{nd}$ stage optical matrix switch group or said $2^{nd}$ stage optical matrix switch group and said $3^{rd}$ stage optical matrix switch group are connected by N-core ribbon-like optical fibers.

5. The K×K optical switch unit according to claim 1, wherein said N×N optical matrix switch includes a dummy port.

6. A K×K optical switch unit comprising:
a first ($1^{st}$) stage optical matrix switch group which is comprised of K units of 1×M optical matrix switches set in parallel;
a second ($2^{nd}$) stage optical matrix switch group which is comprised of $M^2$ units of N×N optical matrix switches set in parallel and connected with said $1^{st}$ stage optical matrix switch group;
a third ($3^{rd}$) stage optical matrix switch group which is comprised of K units of M×1 optical matrix switches set in parallel and connected with said $2^{nd}$ stage optical matrix switch group, where K=M×N, M and N are integers more than 1;
K optical signal input ports;
K optical signal output ports connected with said $3^{rd}$ stage optical matrix switch group; and a control circuit for controlling a plurality of optical switch elements included in said 1$^{st}$ stage, 2$^{nd}$ stage and 3$^{rd}$ stage optical matrix switch groups;

wherein said 1$^{st}$ stage optical matrix switch group is connected with said K optical signal input port and has (K×M) output terminals, said 2$^{nd}$ stage optical matrix switch group is connected with said (K×M) output terminals of said 1$^{st}$ stage optical matrix switch group, and said 3$^{rd}$ stage optical matrix switch group is connected with said (K×M) output terminals of said 2$^{nd}$ stage optical matrix switch group.

7. The K×K optical switch unit according to claim 6 further comprising:

an input-side board containing said 1$^{st}$ stage optical matrix switch group and a part of said 2$^{nd}$ stage optical matrix switch group; and an output-side board containing the other part of said 2$^{nd}$ stage optical matrix switch group and said 3$^{rd}$ stage optical matrix switch group.

8. K×K optical switch unit according to claim 7, wherein said input-side board and said output-side board are connected by a plurality of ribbon-like optical fibers.

9. The K×K optical switch unit according to claim 8, wherein said N×N optical matrix switch includes a dummy port.

10. The K×K optical switch unit according to claim 7, wherein said input-side board is comprised of 1$^{st}$–Mth input-side sub-boards, each of said input-side sub-boards further comprising:

N units of 1×M optical matrix switches; and

1$^{st}$–Mth input-side blocks connected with said N units of 1×M optical matrix switches, wherein each of said input-side blocks is one of an N×N optical matrix switch and a connector;

wherein said output-side board is comprised if 1$^{st}$–Mth output-side sub-boards, each of said output-side sub-boards further comprising:

1$^{st}$–Mth output-side blocks, wherein each of said output-side blocks is one of an N×N optical matrix switch and a connector; and N units of M×1 optical matrix switches connected with said 1$^{st}$–Mth output-side blocks;

ribbon-like optical fibers connecting an "n"th input-side block of an "m"th input-side sub-board (where 1≦n≦N, and 1≦m≦M) with said "m"th output-side block of said "m"th output-side block of said "n"th output-side sub-board; and wherein if said "n"th input-side block of said "m"th input-side sub-board is said N×N optical matrix switch, said "m"th output-side block of said "n"th output-side sub-board is said connector, or if said "n" input-side block said "m"th input-side sub-board is said connector, sand "m"th output-side block of said "n"th output-side sub-board is said N×N optical matrix switch.

11. The K×K optical switch unit according to claim 10, wherein if n+M×(m−1) is an even number, said "n"th input-side block of said "m"th input-side sub-board is said N×N optical matrix switch, and if conversely, said "n"th input-side block of said "m"th input-side sub-board is said connector.

12. The K×K optical switch unit according to claim 10, wherein said N units of 1×M optical matrix switches of said input-side sub-board or said N units of M×1 optical matrix switches of said output-side sub-board is an unified waveguide module.

* * * * *

UNITED STATES PATENT AND TRADEMARK OFFICE
CERTIFICATE OF CORRECTION

| | | |
|---|---|---|
| PATENT NO. | : 6,493,481 B2 | Page 1 of 1 |
| APPLICATION NO. | : 09/778858 | |
| DATED | : December 10, 2002 | |
| INVENTOR(S) | : Okayama et al. | |

It is certified that error appears in the above-identified patent and that said Letters Patent is hereby corrected as shown below:

Title Page, Item (54) Title:

Please change the title from "OPTICAL SWITCH UNIT"

to "A LARGE SCALE OPTICAL MATRIX SWITCH UNIT"

Signed and Sealed this

Nineteenth Day of June, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 6,493,481 B2 | Page 1 of 1 |
| APPLICATION NO. | : 09/778858 | |
| DATED | : December 10, 2002 | |
| INVENTOR(S) | : Okayama et al. | |

It is certified that error appears in the above-identified patent and that said Letters Patent is hereby corrected as shown below:

Title Page, Item (54) and column 1, line 1, Title:

Please change the title from "OPTICAL SWITCH UNIT"

to "LARGE SCALE OPTICAL MATRIX SWITCH UNIT"

This certificate supersedes the Certificate of Correction issued June 19, 2012.

Signed and Sealed this
Thirty-first Day of July, 2012

David J. Kappos
*Director of the United States Patent and Trademark Office*